United States Patent

Butler

[15] 3,689,914

[45] Sept. 5, 1972

[54] WAVEFORM GENERATOR

[72] Inventor: Jaquith Gould Butler, Cherry Hill, N.J.

[73] Assignee: RCA Corporation,

[22] Filed: Aug. 9, 1971

[21] Appl. No.: 170,296

Related U.S. Application Data

[63] Continuation of Ser. No. 836,751, June 26, 1969, abandoned.

[52] U.S. Cl. ..............340/347 DA, 235/197, 328/14, 328/181, 328/185, 235/175

[51] Int. Cl. ..........................................H03k 13/02

[58] Field of Search...307/227, 228; 325/38; 328/13, 328/14, 181, 185, 186; 235/197, 150.53, 175; 340/347 DA

[56] References Cited

UNITED STATES PATENTS

| | | | |
|---|---|---|---|
| 3,337,863 | 8/1967 | Lender | 325/38 |
| 3,349,195 | 10/1967 | Gray | 340/347 X |
| 3,490,049 | 1/1970 | Choquet et al. | 340/347 X |

*Primary Examiner*—Thomas A. Robinson
*Assistant Examiner*—Charles D. Miller
*Attorney*—Edward J. Norton

[57] ABSTRACT

A waveform generator is disclosed in which a constant binary signal is applied to a digital accumulator. For every clock pulse, the accumulator adds the binary signal and its stored contents and then stores the added sum. Periodically the accumulator becomes full and at the next clock pulse, the value of the contents returns to approximately zero. The stored signal from the accumulator is applied to a digital-to-analog converter and an analog signal is derived therefrom corresponding to the binary number stored in the accumulator. A periodic wave appears at the output of the digital-to-analog converter having a frequency equal to $K/2N \times f_c$ where $K$ is the analog value of the constant, $N$ the number of stages in the accumulator, and $f_c$ the clock frequency. This frequency can be varied within one clock cycle without causing a phase discontinuity in the output signal by merely changing the value of the constant binary signal.

5 Claims, 9 Drawing Figures

INVENTOR
Jaquith G. Butler

BY Edward J Norton
ATTORNEY

INVENTOR
Jaquith G. Butler
BY Edward J. Norton
ATTORNEY

| t/fc | Constant B1 | Constant B2 | Constant B3 | Accumulator A1 | Accumulator A2 | Accumulator A3 | Accumulator A4 | D/A |
|---|---|---|---|---|---|---|---|---|
| 0 | 1 | 1 | 0 | 0 | 0 | 0 | 0 | 0 |
| 1 | 1 | 1 | 0 | 1 | 1 | 0 | 0 | 3 |
| 2 | 1 | 1 | 0 | 0 | 1 | 1 | 0 | 6 |
| 3 | 1 | 1 | 0 | 1 | 0 | 0 | 1 | 9 |
| 4 | 1 | 1 | 0 | 0 | 0 | 1 | 1 | 12 |
| 5 | 1 | 1 | 0 | 1 | 1 | 1 | 1 | 15 |
| 6 | 1 | 1 | 0 | 0 | 1 | 0 | 0 | 2 |
| 7 | 1 | 1 | 0 | 1 | 0 | 1 | 0 | 5 |
| 8 | 1 | 1 | 0 | 0 | 0 | 0 | 1 | 8 |
| 9 | 1 | 1 | 0 | 1 | 1 | 0 | 1 | 11 |
| 10 | 1 | 1 | 0 | 0 | 1 | 1 | 1 | 14 |
| 11 | 1 | 1 | 0 | 1 | 0 | 0 | 0 | 1 |

| t/fc | Constant B1 | Constant B2 | Constant B3 | Accumulator A1 | Accumulator A2 | Accumulator A3 | Accumulator A4 | D/A |
|---|---|---|---|---|---|---|---|---|
| 12 | 1 | 1 | 0 | 0 | 0 | 1 | 0 | 4 |
| 13 | 1 | 1 | 0 | 1 | 1 | 1 | 0 | 7 |
| 14 | 1 | 1 | 0 | 0 | 1 | 0 | 1 | 10 |
| 15 | 1 | 1 | 0 | 1 | 0 | 1 | 1 | 13 |
| 16 | 1 | 1 | 0 | 0 | 0 | 0 | 0 | 0 |
| 17 | 1 | 1 | 0 | 1 | 1 | 0 | 0 | 3 |
| 18 | 1 | 1 | 0 | 0 | 1 | 1 | 0 | 6 |
| 19 | 1 | 1 | 0 | 1 | 0 | 0 | 1 | 9 |
| 20 | 1 | 1 | 0 | 0 | 0 | 1 | 1 | 12 |
| 21 | 1 | 1 | 0 | 1 | 1 | 1 | 1 | 15 |
| 22 | 1 | 1 | 0 | 0 | 1 | 0 | 0 | 2 |
| 23 | 1 | 1 | 0 | 1 | 0 | 1 | 0 | 5 |

| t/fc | Constant B1 | Constant B2 | Constant B3 | Accumulator A1 | Accumulator A2 | Accumulator A3 | Accumulator A4 | D/A |
|---|---|---|---|---|---|---|---|---|
| 24 | 1 | 1 | 0 | 0 | 0 | 0 | 1 | 8 |
| 25 | 1 | 1 | 0 | 1 | 1 | 0 | 1 | 11 |
| 26 | 1 | 1 | 0 | 0 | 1 | 1 | 1 | 14 |
| 27 | 1 | 1 | 0 | 1 | 0 | 0 | 0 | 1 |
| 28 | 1 | 1 | 0 | 0 | 0 | 1 | 0 | 4 |
| 29 | 1 | 1 | 0 | 1 | 1 | 1 | 0 | 7 |
| 30 | 1 | 1 | 0 | 0 | 1 | 0 | 1 | 10 |
| 31 | 1 | 1 | 0 | 1 | 0 | 1 | 1 | 13 |
| 32 | 1 | 1 | 0 | 0 | 0 | 0 | 0 | 0 |
| 33 | 1 | 1 | 0 | 1 | 1 | 0 | 0 | 3 |
| 34 | 1 | 1 | 0 | 0 | 1 | 1 | 0 | 6 |
| 35 | 1 | 1 | 0 | 1 | 0 | 0 | 1 | 9 |

INVENTOR
Jaquith G. Butler

BY Edward J Norton
ATTORNEY

| t/fc | Constant B1 | B2 | B3 | Accumulator A1 | A2 | A3 | A4 | D/A |
|---|---|---|---|---|---|---|---|---|
| 0 | 1 | 1 | 0 | 0 | 0 | 0 | 0 | 0 |
| 1 | 1 | 1 | 0 | 1 | 1 | 0 | 0 | 3 |
| 2 | 1 | 1 | 0 | 0 | 1 | 1 | 0 | 6 |
| 3 | 1 | 1 | 0 | 1 | 0 | 0 | 1 | 9 |
| 4 | 1 | 1 | 0 | 0 | 0 | 1 | 1 | 12 |
| 5 | 1 | 1 | 0 | 1 | 1 | 1 | 1 | 15 |
| 6 | 1 | 1 | 0 | 0 | 1 | 0 | 0 | 2 |
| 7 | 1 | 1 | 0 | 1 | 0 | 1 | 0 | 5 |
| 8 | 1 | 1 | 0 | 0 | 0 | 0 | 1 | 8 |
| 15 | 1 | 1 | 0 | 1 | 0 | 1 | 1 | 13 |
| 16 | 1 | 1 | 0 | 0 | 0 | 0 | 0 | 0 |

| t/fc | Constant B1 | B2 | B3 | Accumulator A1 | A2 | A3 | A4 | D/A |
|---|---|---|---|---|---|---|---|---|
| 17 | 1 | 1 | 0 | 1 | 1 | 0 | 0 | 3 |
| 18 | 1 | 1 | 0 | 0 | 1 | 1 | 0 | 6 |
| 19 | 1 | 1 | 0 | 1 | 0 | 0 | 1 | 9 |
| 20 | 0 | 1 | 0 | 1 | 1 | 0 | 1 | 11 |
| 21 | 0 | 1 | 0 | 1 | 0 | 1 | 1 | 13 |
| 22 | 0 | 1 | 0 | 1 | 1 | 1 | 1 | 15 |
| 23 | 0 | 1 | 0 | 1 | 0 | 0 | 0 | 1 |
| 24 | 0 | 1 | 0 | 1 | 1 | 0 | 0 | 3 |
| 25 | 0 | 1 | 0 | 1 | 0 | 1 | 0 | 5 |
| 26 | 0 | 1 | 0 | 1 | 1 | 1 | 0 | 7 |
| 27 | 0 | 1 | 0 | 1 | 0 | 0 | 1 | 9 |
| 28 | 0 | 1 | 0 | 1 | 1 | 0 | 1 | 11 |

| t/fc | Constant B1 | B2 | B3 | Accumulator A1 | A2 | A3 | A4 | D/A |
|---|---|---|---|---|---|---|---|---|
| 29 | 0 | 1 | 0 | 1 | 0 | 1 | 1 | 13 |
| 30 | 0 | 1 | 0 | 1 | 1 | 1 | 1 | 15 |
| 31 | 0 | 1 | 0 | 1 | 0 | 0 | 0 | 1 |
| 45 | 0 | 1 | 0 | 1 | 0 | 1 | 1 | 13 |
| 46 | 0 | 1 | 0 | 1 | 1 | 1 | 1 | 15 |
| 47 | 0 | 1 | 0 | 1 | 0 | 0 | 0 | 1 |
| 48 | 0 | 1 | 0 | 1 | 1 | 0 | 0 | 3 |
| 49 | 1 | 0 | 0 | 0 | 0 | 1 | 0 | 4 |
| 60 | 1 | 0 | 0 | 1 | 0 | 1 | 0 | 5 |
| 61 | 1 | 0 | 0 | 0 | 1 | 1 | 0 | 6 |

INVENTOR
Jaquith G. Butler

BY Edward J. Norton
ATTORNEY

| t/fc | STORE | | | | | ACCUM. | | | | D/A |
|---|---|---|---|---|---|---|---|---|---|---|
| | $S_1$ | $S_2$ | $S_3$ | $S_4$ | $S_5$ | $A_1$ | $A_2$ | $A_3$ | $A_4$ | |
| 0 | 0 | 0 | 0 | 0 | 0 | 0 | 0 | 0 | 0 | 0 |
| 1 | 1 | 1 | 0 | 0 | 0 | 1 | 1 | 0 | 0 | 3 |
| 2 | 0 | 1 | 1 | 0 | 0 | 0 | 1 | 1 | 0 | 6 |
| 3 | 1 | 0 | 0 | 1 | 0 | 1 | 0 | 0 | 1 | 9 |
| 4 | 0 | 0 | 1 | 1 | 0 | 0 | 0 | 1 | 1 | 12 |
| 5 | 1 | 1 | 1 | 1 | 0 | 1 | 1 | 1 | 1 | 15 |
| 6 | 0 | 1 | 0 | 0 | 1 | 1 | 0 | 1 | 1 | 13 |
| 7 | 1 | 0 | 1 | 0 | 1 | 0 | 1 | 0 | 1 | 10 |
| 8 | 0 | 0 | 0 | 1 | 1 | 1 | 1 | 1 | 0 | 7 |
| 9 | 1 | 1 | 0 | 1 | 1 | 0 | 0 | 1 | 0 | 4 |
| 10 | 0 | 1 | 1 | 1 | 1 | 1 | 0 | 0 | 0 | 1 |
| 11 | 1 | 0 | 0 | 0 | 0 | 1 | 0 | 0 | 0 | 1 |
| 12 | 0 | 0 | 1 | 0 | 0 | 0 | 0 | 1 | 0 | 4 |
| 13 | 1 | 1 | 1 | 0 | 0 | 1 | 1 | 1 | 0 | 7 |

CONSTANT = 1-1-0

| t/fc | STORE | | | | | ACCUM. | | | | D/A |
|---|---|---|---|---|---|---|---|---|---|---|
| | $S_1$ | $S_2$ | $S_3$ | $S_4$ | $S_5$ | $A_1$ | $A_2$ | $A_3$ | $A_4$ | |
| 14 | 0 | 1 | 0 | 1 | 0 | 0 | 1 | 0 | 1 | 10 |
| 15 | 1 | 0 | 1 | 1 | 0 | 1 | 0 | 1 | 1 | 13 |
| 16 | 0 | 0 | 0 | 0 | 1 | 1 | 1 | 1 | 1 | 15 |
| 17 | 1 | 1 | 0 | 0 | 1 | 0 | 0 | 1 | 1 | 12 |
| 18 | 0 | 1 | 1 | 0 | 1 | 1 | 0 | 0 | 1 | 9 |
| 19 | 1 | 0 | 0 | 1 | 1 | 0 | 1 | 1 | 0 | 6 |
| 20 | 0 | 0 | 1 | 1 | 1 | 1 | 1 | 0 | 0 | 3 |
| 21 | 1 | 1 | 1 | 1 | 1 | 0 | 0 | 0 | 0 | 0 |
| 22 | 0 | 1 | 0 | 0 | 0 | 0 | 1 | 0 | 0 | 2 |
| 23 | 1 | 0 | 1 | 0 | 0 | 1 | 0 | 1 | 0 | 5 |
| 24 | 0 | 0 | 0 | 1 | 0 | 0 | 0 | 0 | 1 | 8 |
| 25 | 1 | 1 | 0 | 1 | 0 | 1 | 1 | 0 | 1 | 11 |
| 26 | 0 | 1 | 1 | 1 | 0 | 0 | 1 | 1 | 1 | 14 |
| 27 | 1 | 0 | 0 | 0 | 1 | 0 | 1 | 1 | 1 | 14 |

| t/fc | STORE | | | | | ACCUM. | | | | D/A |
|---|---|---|---|---|---|---|---|---|---|---|
| | $S_1$ | $S_2$ | $S_3$ | $S_4$ | $S_5$ | $A_1$ | $A_2$ | $A_3$ | $A_4$ | |
| 28 | 0 | 0 | 1 | 0 | 1 | 1 | 1 | 0 | 1 | 11 |
| 29 | 1 | 1 | 1 | 0 | 1 | 0 | 0 | 0 | 1 | 8 |
| 30 | 0 | 1 | 0 | 1 | 1 | 1 | 0 | 1 | 0 | 5 |
| 31 | 1 | 0 | 1 | 1 | 1 | 0 | 1 | 0 | 0 | 2 |
| 32 | 0 | 0 | 0 | 0 | 0 | 0 | 0 | 0 | 0 | 0 |
| 33 | 1 | 1 | 0 | 0 | 0 | 1 | 1 | 0 | 0 | 3 |
| 34 | 0 | 1 | 1 | 0 | 0 | 0 | 1 | 1 | 0 | 6 |
| 35 | 1 | 0 | 0 | 1 | 0 | 1 | 0 | 0 | 1 | 9 |
| 36 | 0 | 0 | 1 | 1 | 0 | 0 | 0 | 1 | 1 | 12 |
| 37 | 1 | 1 | 1 | 1 | 0 | 1 | 1 | 1 | 1 | 15 |
| 38 | 0 | 1 | 0 | 0 | 1 | 1 | 0 | 1 | 1 | 13 |
| 39 | 1 | 0 | 1 | 0 | 1 | 0 | 1 | 0 | 1 | 10 |
| 40 | 0 | 0 | 0 | 1 | 1 | 1 | 1 | 1 | 0 | 7 |

INVENTOR
Jaquith G. Butler
BY Edward J. Norton
ATTORNEY

WAVEFORM GENERATOR

This is a continuation of my copending application, Ser. No. 836,751, filed June 26, 1969 and now abandoned.

This invention relates to waveform generation and more particularly to apparatus for generating a constant frequency waveform in which the frequency may be changed within one cycle.

In existing frequency synthesizers or other types of waveform generators, a major problem is changing the frequency of the waveform during the operation of the equipment with which the generator is associated. When it is desired to change the frequency of the voltage controlled oscillator of a typical digital frequency synthesizer, the divisor of a variable dividing network is changed causing an imbalance in the phase lock loop. A phase comparator then changes the control voltage applied to the oscillator causing it to oscillate at a different frequency. Eventually the loop again becomes phase locked and a constant frequency is attained. However, it takes a considerable time to relock the loop and during this time the oscillator is oscillating at many different frequencies none of which are desired. One serious consequence of this is that during the lock-up time, it is impossible to properly operate the equipment to which the oscillations are applied due to the fact that the undesirable frequencies are occurring.

The above problem is clearly perceived when for instance, it is desired to use a frequency to control the speed of a motor. If it is desired to reduce the speed by 10 percent, a mere change of the dividing network in the phase lock loop type frequency synthesizer will eventually do this but in the mean time the synthesizer will be at frequencies quite a bit or higher or quite a bit lower than either the desired or the initial frequency. Thus the motor will be speeding up and slowing down during this time, and generally, this can not be tolerated. Ideally one wishes to be able to change the frequency instantaneously or at least within one cycle so that at one instant the old frequency is occurring and the next instant the new frequency is occurring.

In another type of frequency synthesizer it is possible to change frequencies by switching different crystals into and out of the oscillator circuit, but again this type of synthesizer produces large phase and amplitude transients when the switching occurs.

It is an object of this invention to provide an improved variable frequency waveform generator.

There is provided means for generating a digital signal which is applied to an accumulator. The accumulator accumulates and stores a digital signal and the output of the accumulator is applied to a digital-to-analog converter which reads the stored contents of the accumulator in analog form. The accumulator generates a wave having a frequency which is determined by the digital signal applied to the accumulator.

The invention is better understood with reference to the drawing in which.

Figure 1:
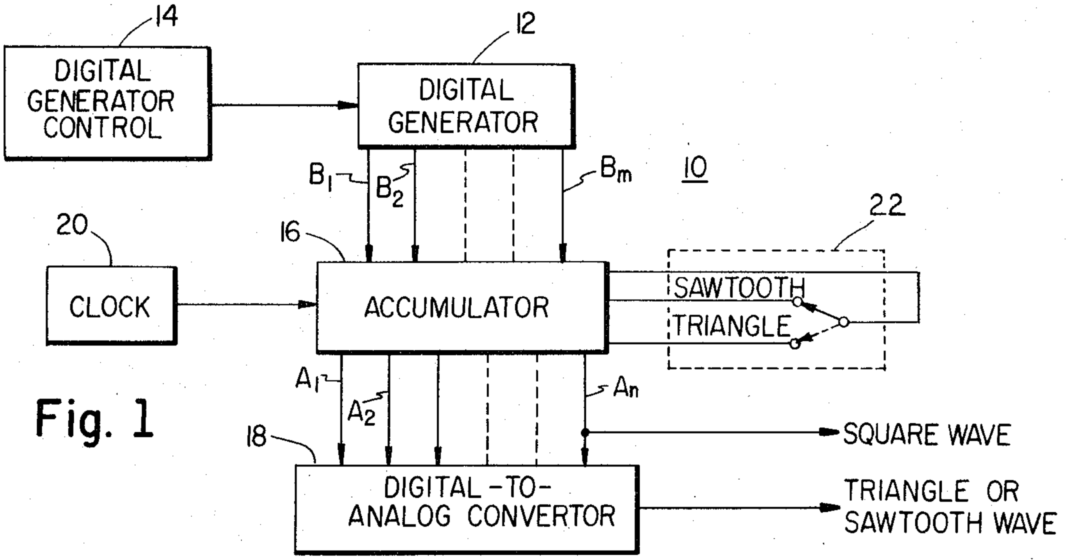
FIG. 1 is a block diagram of a waveform generator according to one embodiment of the invention.

Referring now to FIG. 1, variable frequency waveform generator 10 includes a digital generator 12 and a digital generator control 14, digital accumulator 16, digital-to-analog convertor 18, and clock 20.

Digital generator 12 and digital generator control 14 act together to produce a desired digital number in binary form of $M$ digits at a plurality of outputs $B_1$ –$B_m$ thereof. There is included in generator 12 a series of gates which are responsive to digital generator control 14 such that by a mere change of the setting of control 14, generator 12 will provide a different binary signal at its outputs. The least significant digit of the number appears at output $B_1$ and the most significant digit of the number appears at output $B_m$. Thus, if a digital number corresponding to "2" were desired, output $B_2$ would be in the "1" state and outputs $B_1$, and $B_3$ –$B_m$ would be in the "0" state, since the binary number 0–1–0–0 . . . 0 corresponds to the number "2".

Accumulator 16 is a digital accumulator which at every clock pulse $f_c$ from clock 20 adds the value of the binary number applied thereto to a number already stored therein and replaces the stored number with the sum. In waveform generator 10, accumulator 16 is an $N$ stage accumulator where $N \geq M$. Each of the first M stages of accumulator 16 has a corresponding one of the outputs $B_1$ –$B_m$ of digital generator 12 applied to it. Thus, the $B_1$ output from digital generator 12 is applied to the first stage the $B_2$ output to the second stage and so forth. Accumulator 16 has a plurality of outputs, $A_1$ –$A_n$, each of which is an output of a corresponding stage, and each of which will have a "1" or a "0" thereat. The outputs $A_1$ –$A_n$ of accumulator 16 are coupled to digital-to-analog converter 18 which converts the then existing stored binary number appearing at these outputs into an analog voltage.

Waveform generator 10 is arranged so that three different types of frequency varying waves can be obtained therefrom. By taking the signal from the final stage output $A_n$ of accumulator 16, a square wave may be obtained and the digital-to-analog 18 converter would be unnecessary. On the other hand, by including digital-to-analog converter 18 in the system and taking the output signal therefrom, either a sawtooth wave or a triangle wave may be obtained, depending upon the position of switch 22. If switch 22 is set at the "sawtooth" position a sawtooth wave appears at the output of digital-to-analog converter 18 and if switch 22 is set in the "triangle" position, a triangle wave will appear at the output of digital-to-analog converter 18. The implementation of this feature is explained hereinafter.

Figure 2:
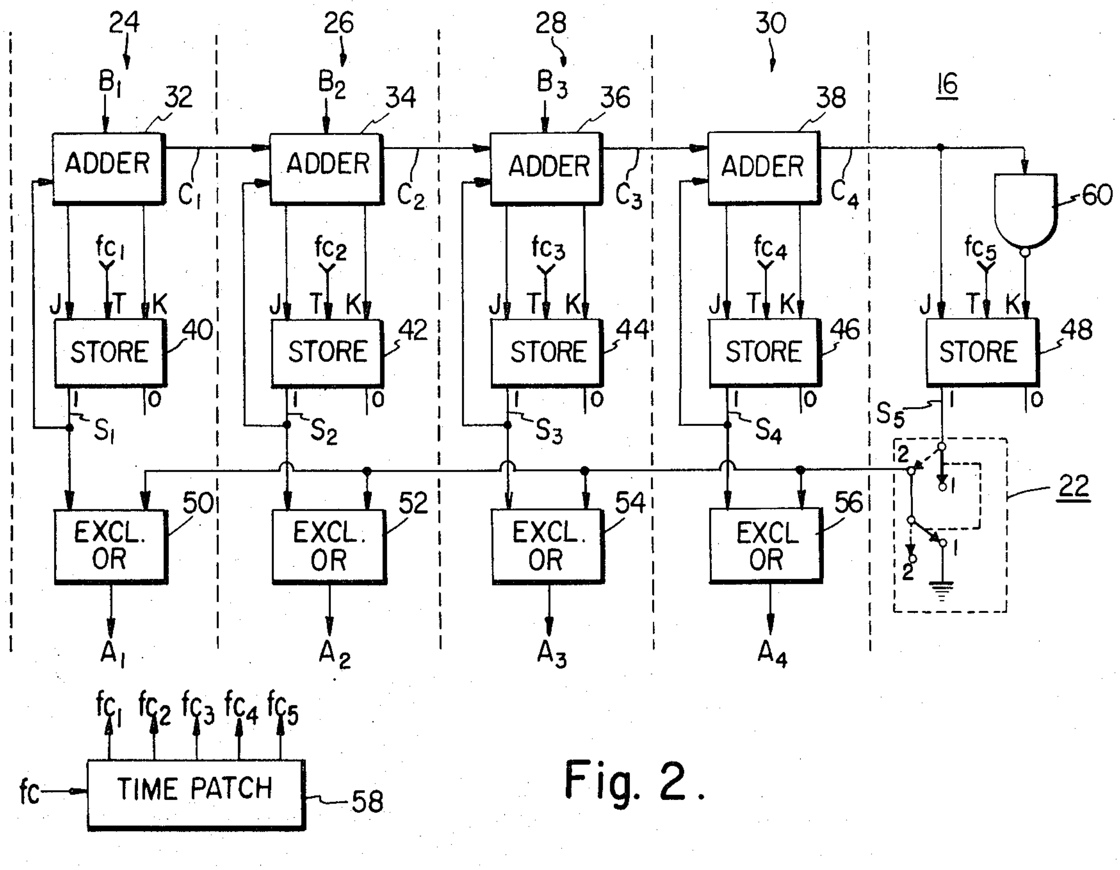
FIG. 2 is a block diagram of the accumulator shown in FIG. 1.

Referring now to FIG. 2, a more detailed diagram of a four N stage 24, 26, 28 and 30 accumulator 16 is shown where M is equal to three. In accumulator 16, there is an adder circuit 32, 34, 36 and 38, a store circuit 40, 42, 44 and 46 and an exclusive OR gate 50, 52, 54, and 56 for each stage and also an overflow store circuit 48. There is also provided a time patch 58.

Each of the store circuits 40–48 is a conventional flip-flop operating in the J-K mode with two control inputs J and K, a trigger input T, and two outputs, "1" and "0". The signal at the "1" output of each store circuit 40–48 will be designated as the $S_x$ signal where $x$ corresponds to the stage of the accumulator in question. Thus the $S_1$ signal is the signal appearing at the output of store circuit 40 in stage 24.

Each of the adder circuits 32–38 is what is commonly known as a full adder or in other words, a set of logic gates which adds at least two binary numbers and provides signals at a sum output and a carry output. A detailed description of the logic circuit of any one of the adder circuits 32–38 is given in connection with FIG. 3 hereinafter. Each adder circuit has three inputs and three outputs. A respective one of the $B_x$ signals from digital generator 12 is applied to a first one of the inputs of each adder. If there is no corresponding B signal for the adder in question (such as adder 38) it will be assumed that the signal at that input is always "0". Two of the three outputs from each adder are coupled respectively to the J and K inputs of the corresponding store circuits 40–46. These two outputs will always have opposite polarity signal appearing thereat. The third output of each adder circuit 32–38 is the carry output and is applied to the second input of the next stage adder circuit if any, as the carry input signal. As used herein, the signal appearing at the carry output of each adder circuit 32–38 is designated as the $C_x$ signal where $x$ refers to the particular stage with which the adder is associated. Thus, the $C_{x-1}$ signal will be applied to the carry input of each adder circuit. It should be noted that the first stage 24 adder circuit 32 has no carry input signal applied thereto. The $C_4$ signal from the carry output of the forth stage 30 is applied directly to the J input of store circuit 48 and through invertor 60 to the K input of store circuit 48. The S signal at the "1" output of each store circuit 40–46 is applied as the third and final input to its corresponding adder circuit 32–38.

The $S_1 - S_4$ signals are applied to a first input of a corresponding exclusive OR gate 50–56. The $S_5$ signal is applied to switch 22 which includes two switching arms 62 and 64 each of which may be in either of two positions, 1 or 2. When the switching arms 62 and 64 are in position 1, which corresponds to sawtooth position of switch 22 in FIG. 1, the second input to each of the exclusive OR gates 50–56 will be at ground potential, or in the "0" state. If the switching arms 62 and 64 of switch 22 are changed to position 2, as shown by the dotted line in FIG. 2, a triangle wave can be obtained. In this situation the $S_5$ signal is applied to the second input of each of the exclusive OR gates 50–56. Timing patch 58 is responsive to the clock signal $f_c$ and provides five output signals designated $f_{c1} f_{c2}, f_{c3}, f_{c4}$ and $f_{c5}$ each of which has the same frequency as the $f_c$ signal.

Accumulator 16, as shown in FIG. 2, operates in the following manner. Each of the adder circuits 32–38 will add the binary value the B, C, and S signals applied to it and apply either a "1" or a "0" to the output coupled to the J input of the corresponding store circuit, a "0" or a "1" to the output coupled to the K input of the corresponding store circuit, and a "1" or a "0" to the carry output. instance if the B, C, and S signal applied to adder circuit 34 are all "1", a "1" will be applied to the J input and a "0" to the K input of store circuit 42, and a "1" signal will appear at the carry output from the adder 34. If two of the three signals are "1", a "0" will be applied to the J input, a "1" to the "K" input, and a "1" to the carry output; if only one of the signals is "1", a "1" will be applied to the J input, a "0" to the K input, and a "0" to the carry output; and finally if all three of the signals are "0", a "0" will be applied to the J input a "1" to the K input, and a "0" to the carry output. If a "1" is applied to the J input and "0" to the K input of any particular one of the store circuits, the occurrence of a pulse at the trigger input, which is being applied from time patch 58, will cause the "1" output, or the $S_x$ signal, to go to the "1" state if it is not already there. On the other hand if the J input is "0" and the K input is "1", the occurrence of the trigger pulse will cause the "1" output, or the $S_x$ signal, to then go to the "0" state if it is not already there.

The "1" output of each store circuit 40–48 is applied to one input of corresponding exclusive OR gate 50–56. The second input of the exclusive OR gates 50–56 are coupled to switch 22 and will have a "1" or "0" applied thereto. A respective one of the $A_1 - A_4$ accumulator output signals is taken from the output of each exclusive OR gate 50–56, and its value is determined by the signals applied to the two inputs of that gate. Thus, if the two inputs are the same, that is, both "0" or both "1", the corresponding $A_x$ signal will be "0". On the other hand, if the two inputs are opposite, the $A_x$ signal will be "1".

Figure 3:
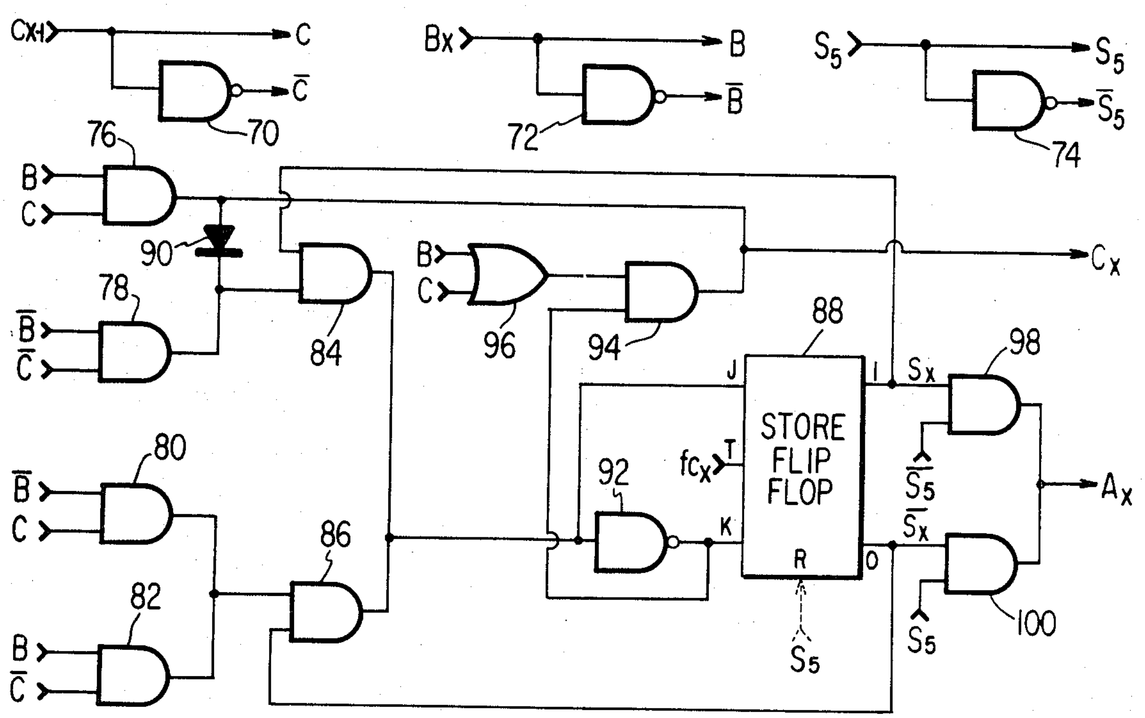
FIG. 3 is a diagram of one stage of the accumulator shown in FIG. 2.

Reference is now made to FIG. 3 in which a detailed diagram of one stage of accumulator 16 which performs the operations just described is shown. The carry signal from the previous stage is designated $C_{x-1}$ and is applied to invertor 70. In FIG. 3, the C signal is the $C_{x-1}$ signal and the output of invertor 70 is the $\bar{C}$ signal. A $B_x$ signal from the corresponding stage of digital generator 12 is applied to invertor 72. In FIG. 3, the B signal is the $B_x$ signal and the $\bar{B}$ signal is the signal at the output of invertor 72. Similarly, the $S_5$ signal is applied to invertor 74 and a signal designated as the $\bar{S}_5$ signal appears at the output thereof.

Six two-input AND gates 76, 78, 80, 82, 84 and 86 are provided for deriving the signal to be applied to the J and K inputs of store flip-flop 88. The B and C signals are applied to the inputs of AND gate 76 and the $\bar{B}$ and $\bar{C}$ signals are applied to the inputs of AND gates 78. The $\bar{B}$ and C signals are applied to the inputs of AND gates 80 and B and $\bar{C}$ signals are applied to the inputs of AND gates 82. The outputs of AND gate 76 is coupled to the anode of diode 90 and the cathode of diode 90 is coupled to the output of AND gate 78 and one input of AND gate 84. The outputs of AnD gates 80 and 82 are coupled together and to one input of AND gate 86. The second input of AND gate 84 is coupled to the "1" output of store flip flop 88 at which appears the $\bar{S}_x$ signal and the second input of AND gate 86 is coupled to the "0" output of store flip-flop 88 at which appears the $S_x$ signal. The outputs of AND gates 84 and 86 are coupled together and applied directly to the J input of store flip-flop 88 and through invertor 92 to the K input of store flip-flop 88.

The output of invertor 92 is also coupled to one input of AND gate 94. The B and C signals are applied to two input OR gate 96, the output of which is coupled to the other input of AND gate 94. The output of AND gate 94 is coupled to the junction of AND gate 76 and the anode of diode 90 and the output carry signal $C_x$ for that stage appears at that coupling. The trigger input T of store flip-flop 88 is coupled a respective one of $f_c$ signals from patch network 58 (designated $f_{cx}$ herein).

The "1" output of store flip-flop 88 is applied to one input of AND gate 98 with the other input being coupled to the $\bar{S}_5$ signal. The "0" output of store flip-flop 88 is applied to one input of AND gate 100 with the other input being coupled to the $S_5$ signal. The outputs of AND gates 98 and 100 are coupled together, thus forming a phantom OR gate, and the $A_x$ signal appears thereat.

From above, it was seen that where none of the B, C, or $S_x$ signals are "1", it was desirous to have a "0" applied to both the J input of store flip-flop 88 and the $C_x$ output; when only one of the three signals are "1" it is desirous to apply a "1" to the J input of store flip-flop 88 and a "0" to the $C_x$ output; when any two of the three signals are "1" it is desirous to apply a "0" to the J input store flip-flop 88 and the "1" to the $C_x$ output; and finally, when all three of the signals are "1" it is desirous to apply "1" signal to the J input of store flip-flop 88 and the "1" to the $C_x$ output. The circuit in FIG. 3 satisfies these conditions. For instance if all three of the B, C, and S signals involved are "1", a "1" will appear at the output of AND gate 76 and thus the $C_x$ signal will be "1". Since the $S_x$ signal is "1", and the output of AND gate 76 is "1", a "1" will appear at the output of AND gate 84 which is connected to the J input of store flip-flop 88. Thus, on the occurrence of a $f_{cx}$ pulse, a "1" will remain at the $S_x$ output and $C_x$ will be "1". Similarly if the A, B and C signals are all "0", a "1" signal will appear at the output of AND gate 78 and be applied to one input of AND gate 84. However, since the $S_x$ signal is "0", a "0" will be applied to the output of AND gate 84. Note that diode 90 blocks the output of AND gate 78 from making $C_x$ a "1" signal. Similarly the outputs of AND gates 80, and 82 will be "0" and thus a "0" will appear at the output of AND gate 86. Thus a "0" is applied to the J input of store flip-flop 88. Since B and C are both "0", a "0" will appear at the output of OR gate of 96, and thus the output of AND gate 94. Therefore, since the output of AND gates 76 and 94 are both "0", the $C_x$ signal will be "0". A similar analysis can be applied for the remaining conditions specified above and it will be seen that the circuit of FIG. 3 satisfies all of these conditions.

Figures 4A, 4B:
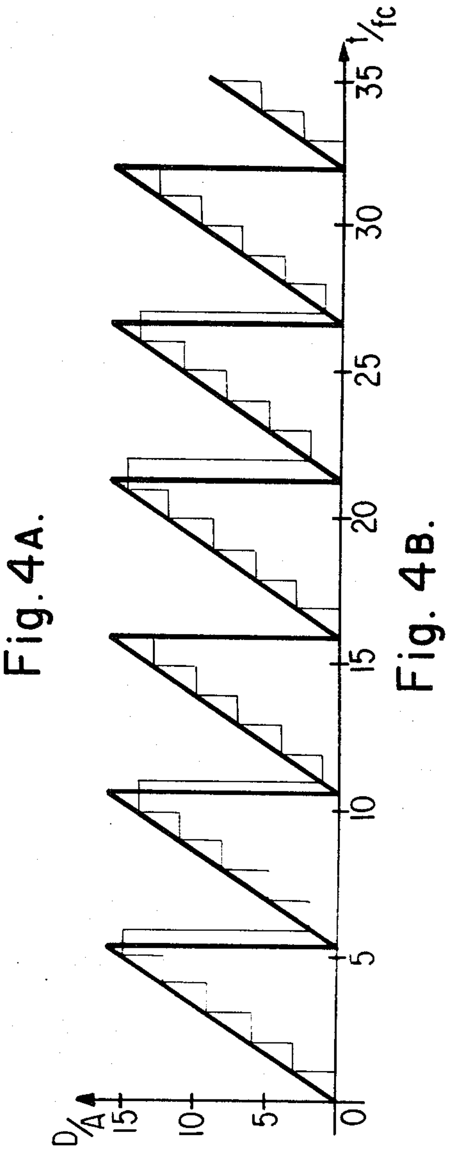
FIGS. 4 through 6 are digital tables and corresponding waveforms useful in describing the operation of the invention.

Referring now to FIG. 4, a detailed explanation of the operation of the invention in its simplest form will now be described. FIG. 4A is a table showing the constant $B_1 - B_3$ and accumulator $A_1 - A_4$ 16 states and the corresponding digital-to-analog converter 18 output valves for a series of $f_c$ pulses. FIG. 4B is a graph showing the output of digital-to-analog converter 18 where the light lines represent the actual output and the heavy lines represent the approximated sawtooth wave. It will be assumed for convenience that N=4 and M=3 as shown in FIG. 2 and that switch 22 is in position 1, as shown by the solid lines in FIGS. 1 and 2. Thus, the $A_1 - A_4$ signals will be identical to the $S_1 - S_4$ signals so exclusive OR gates 50–56 can be neglected for this explanation. In FIG. 4, it is further assumed that the $S_1 - S_4$ and thus the A1–A4 outputs of accumulator 16 are initially in the 0–0–0–0 state and the digital generator is set in the 1—1—0 state. It should be noted that the least significant digit is the first one given in the above binary numbers. When the first $f_c$ pulse from the clock 22 occurs at time $t/f_c$=1, accumulator 16 will add 1–1– to its stored constants of 0–0–0– and store a new sum of 1–1–0–0. This corresponds to a value of three at the output of the digital-to-analog convertor 18. At the second $f_c$ pulse, 1–1–0 is added to 1–1–0–0 and 0–1–1–0 will be stored in accumulator 16 resulting in analog value of six at the output of the digital-to analog convertor 18. This continues through the fifth $f_c$ pulse after which the accumulator is in the 1–1–1–1 state and the digital-to-analog convertor 18 is at 15. At the sixth $f_c$ pulse, 1–1–0 is added to the accumulator and the accumulator overflows and then goes to the 0–1–0–0 state resulting in an analog value of 2 at the output of analog-to-digital convertor 18. After the seventh $f_c$ pulse, accumulator 16 will go to the 1–0–1–0 state and digital-to-analog converter 18 will have a value of 5 at its output. This procedure continues through the fifteenth $f_c$ pulse with digital-to-analog convertor 18 having successive analog values of 8, 11, 14, 1, 4, 7, 10 and 13. After the fifteenth $f_c$ pulse, accumulator 16 is in the 1–0–0–1 state and the addition of 1–1–0 to this results in accumulator 16 going to the 0–0–0–0 state. This same sequence is repeated for every 16 $f_c$ pulses as long as the constant remains 1–1–0. The graph in FIG. 4B shows the output of digital-to-analog convertor 18 which increases linearly in steps in value for five $f_c$ pulses, decreases to near zero, increases linearly in steps for five more $f_c$ pulses, decreases to near zero and so forth. Thus a sawtooth wave having a constant frequency of $3/16 \times f_c$ is obtained at the output of digital-to-analog convertor 18. This signal can be passed through a filter to eliminate much of the ripple (clock frequency and harmonics thereof) appearing at the output of digital-to-analog convertor 18 so that the heavy lined sawtooth wave is obtained. In actual practice, the accumulator will have many more than the four stages described herein so that the rather large ripple value shown in the graph of FIG. 4B will really be much less. Generally speaking, the frequency of the sawtooth wave will be $f_c \times (K/2_N)$ where K is the analog value of the constant, N is the number of stages in accumulator 16, and $f_c$ is the clock frequency.

Figures 5A, 5B:
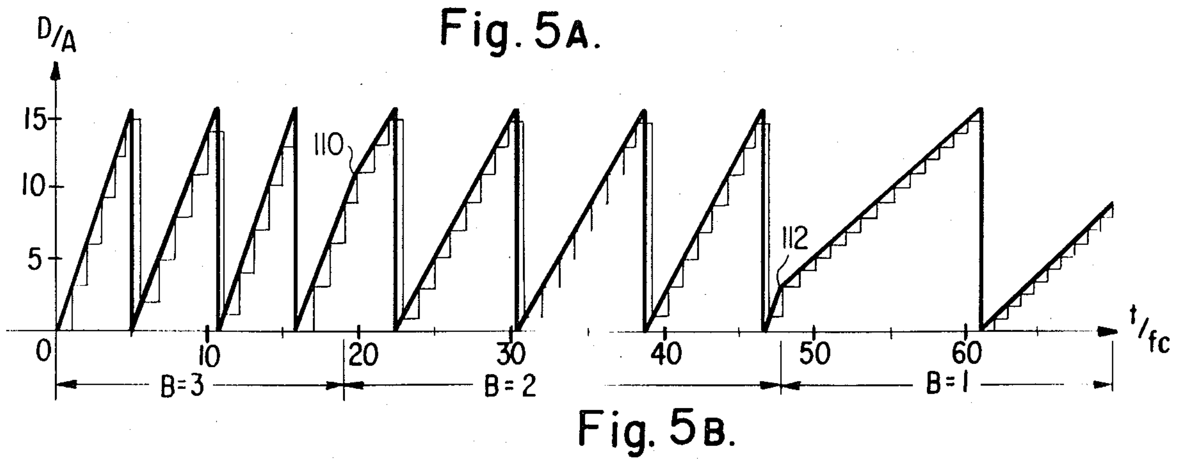

Reference will now be made to FIG. 5 in order to explain how it is possible to change frequency of the waveform at the output of digital-to-analog convertor 18 within one clock cycle of the waveform. FIG. 5A represents a table showing the values of the constant $B_1 - B_3$, the output of the accumulator $A_1 - A_4$, and the corresponding value at the output of digital-to-analog converter 18, D/A, after a given number of $f_c$ pulses. FIG. 5B shows the waveform which appears at the output of digital-to-analog converter 18 in the light lines and the approximated sawtooth wave which corresponds to in the heavy lines. In FIG. 5 it is assumed that the constant is 1–1–0 for the first 19 $f_c$ pulses, 0–1– from after the nineteenth $f_c$ pulse through the forty-eighth $f_c$ pulse, 1–0–0 thereafter. Again switching arms 62 and 64 of switch 22 are in position 1 so the exclusive OR gates 50–56 can be neglected for this discussion. The operation for the first 19 $f_c$ pulses is identical to that described in FIG. 4 and won't be repeated again. However, after the nineteenth $f_c$ pulse the constant is changed from 1–1–0 to 0–1–0. At the time the constant was changed, accumulator 16 was in the 1–0–0–1 state which corresponds to a value of 9 at the output of digital-to-analog converter 18. When 0–1–0 is added to that value, the accumulator goes to the 1–1–0–0 state, corresponding to an analog value of 11. At the twenty-first $f_c$ pulse, 0–1–0 is again added to the accumulator stored contents and a new sum of 1–0–1–1 or 13, is stored therein. This procedure continues through the 48th $f_c$ pulse, at which time accumulator 16 is in the 1–1–0–0 state, or digital-to-analog converter 18 has a value of 3 at its output.

Referring to point 110 in FIG. 5B, it is seen that the slope of the heavy line changes almost instantaneously after the nineteenth $f_c$ pulse. Thus the frequency of the wave will change at this point from a value of $f_c \times 3/16$ to a value of $f_c \times 2/16$.

After the 48th $f_c$ pulse the constant is changed to 1–0–, and the output of digital-to-analog convertor 18 increases in steps of one each time an $f_c$ pulse occurs. Thus, as can be seen at point 112 in FIG. 5B, the slope and consequently, the frequency of the waveform also changes at this time. As long as the content remains unchanged, the frequency of the wave after the 48th $f_c$ pulse will be $f_c/16$.

Referring now to FIG. 6 an explanation will be given of how a triangle wave can be obtained from the output digital-to-analog converter 18 rather than the previously explained sawtooth wave. In this case it will be assumed that the switching arms 62 and 64 of switch 22 in FIG. 2 are at position 2 rather than position 1 in switch 22. Thus, whenever $S_5$ is "1", the output of each exclusive OR gate 50–56 will be opposite from the corresponding $S_1 - S_4$ input applied thereto.

Figures 6A, 6B:
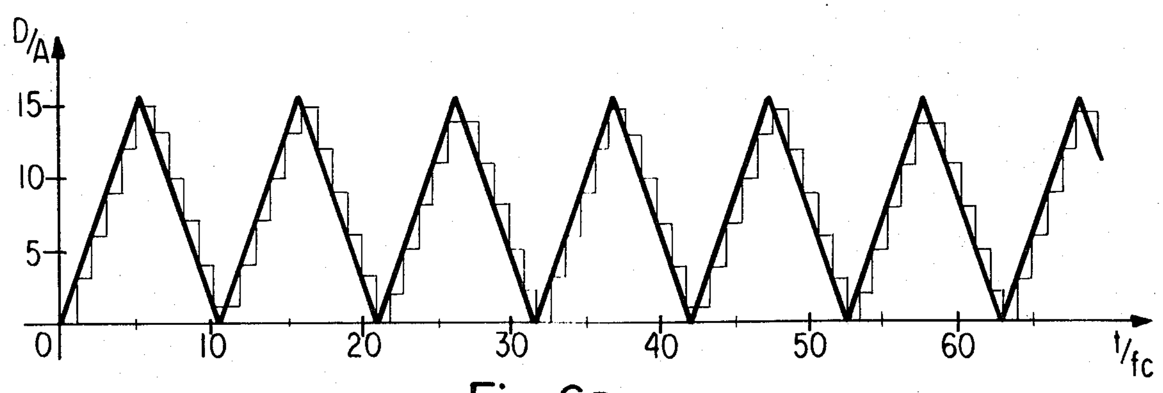

In FIG. 6, it will be assumed that the output of digital generator 12 remains constant at 1–1–0 and that accumulator 16 is initially in the 0–0–0–0 state. The operation of the system will be identical to that described with reference to FIG. 4 until after the occurrence of the fifth $f_c$ pulse. With switching arms 62 and 64 at terminal 2 in switch 22, the occurrence of the sixth $f_c$ pulse causes the $S_5$ signal to become "1", and the $A_1 - A_4$ signals become the inverted $S_1 - S_4$ signals as long as this condition continues. After the sixth $f_c$ pulse, the $S_1 - S_5$ signals are 0–1–0–0–1 so therefore the $A_1 - A_4$ signals are 1–0–1–1, corresponding to an analog value of 13. After the seventh $f_c$ pulse, the $S_1 - S_5$ signals become 1–0–1–0–1 and since $S_5$ is still "1", the $A_1 - A_4$ signals are 0–1–0–1, or analog 10. This continues through the tenth $f_c$ pulse after which $S_1 - S_5$ is 0–1–1–1–1 and $A_1 - A_4$ is 1–0–0–0, or analog 1. After the next fc pulse, $S_1 - S_5$ become 1–0–0–0–0 and since $S_5$ is now "0", the $A_1 - A_4$ signals are the same as the $S_1 - S_4$ signals, that is 1–0–0–0, or analog 1. This procedure continues indefinitely as shown in the table of FIG. 6A, and as can be seen in FIG. 6B, the output signal from digital-to-analog converter 18 approximates a sawtooth wave having a frequency of $f_c$ x 3/32. In actual practice both M and N will be much larger and the frequency of the triangle wave will be $f_c \times (K/2^{N+1})$, where K is the analog value of the constant, N is the number stages in accumulator 16, and $f_c$ is the clock frequency.

Another manner of implementing this invention would be to reset each store flip-flop, as shown in FIG. 3 by the dashed line applied to the reset, R, input of flip-flop 88. This would make each sawtooth pulse identical to every other one, but would reduce the available frequencies. Still another manner of implementing this invention would be to vary the constant or clock frequency during each cycle of the wave to obtain non-linear waves, such as a sine wave.

I claim:

1. A periodic waveform generator comprising:

generating means for generating and selecting one of a plurality of available predetermined digital numbers;

storing means capable of storing a digital number;

adding means coupled to said generating means and said storing means for repetitiously adding during a first time period the number then stored in said storing means and the predetermined number then being generated by said generating means and thereafter storing the resulting sum in said storing means, the end of said first time period being dependent upon the value of said number stored in said storing means being greater than a first specified value, said number stored in said storing means thereafter returning to a second specified value which is less than said first specified value and said adding means thereafter repetitiously adding during a second time period the number then stored in said storing means and the predetermined number then being generated by said generating means, and thereafter storing the sum in said storing means;

said adding means causing said predetermined number generated by said generating means to be repetitiously subtracted from said number stored in said storing means between said first and second time periods; and converting means for continually converting said number stored in said storing means to an analog value, and providing a periodic waveform at an output thereof, the period of said waveform being dependent upon said selected predetermined digital number generated by said generating means.

2. The invention according to claim 1 wherein said first specified value is one more than the maximum value which can be stored in said storing means less the value of said number being generated by said generating means.

3. Waveform generating apparatus comprising:

means for generating a predetermined digital signal, said predetermined digital signal being one of a plurality of predetermined digital signals;

storage means capable of storing digital signals;

means for recurrently adding, during a first condition, said predetermined digital signal and the then existing digital signal stored in said storage means, said storage means recurrently storing a second digital signal corresponding to the total value of said addition in place of the then existing stored signals;

means coupled to said recurrent adding means and to said storage means for causing said storage means to store a third digital signal when said second digital signal exceeds a predetermined value, said third digital signal having a value not greater than the value of said predetermined digital signal;

converting means for providing a periodic analog signal wave in response to said second digital signal stored in said storage means, the frequency of said analog signal being dependent upon the value of said predetermined signal; and means for selecting any one of said plurality of predetermined digital signals for providing a desired change in frequency of said periodic analog signal wave.

4. Waveform generating apparatus comprising:

means for generating a predetermined digital signal, said predetermined digital signal being one of a plurality of predetermined digital signals;

storage means capable of storing digital signals;

means for recurrently adding, during a first condition, said predetermined digital signal and the then existing digital signal stored in said storage means, said storage means recurrently storing a second digital signal corresponding to the total value of said addition in place of the then existing stored signal, said recurrent adding means, after said first condition, causing said storage means to store a third digital signal having a value not less than the value of the previously then existing stored digital signal less the value of said predetermined digital signal; and converting means for providing a periodic analog signal wave in response to said second and third digital signals, the frequency of said analog signal being dependent upon the value of said predetermined signal.

5. The invention according to claim 4 wherein means are provided for selecting any one of said plurality of predetermined digital signals for providing a desired change in frequency of said periodic analog signal wave.

* * * * *

UNITED STATES PATENT OFFICE

CERTIFICATE OF CORRECTION

Patent No. 3,689,914 Dated September 5, 1972

Inventor(s) Jaquith Gould Butler

It is certified that error appears in the above-identified patent and that said Letters Patent are hereby corrected as shown below:

| | |
|---|---|
| Column 3, line 30 | "48" should be --60-- |
| Column 3, line 58 | After "output" insert --For-- |
| Column 4, line 50 | "$\overline{S}_X$" should be -- $S_X$ -- |
| Column 4, line 52 | "$S_X$" should be -- $\overline{S}_X$ -- |
| Column 5, line 65 | "1-1- to" should be -- 1-1-0 to -- |
| Column 5, line 65 | "0-0-0-" should be -- 0-0-0-0 -- |
| Column 6, line 18 | "1-0-0-1" should be -- 1-0-1-1 -- |
| Column 6, line 37 | "$(K/Z_N)$" should be -- $(K/2^N)$ -- |
| Column 6, line 54 | "0-1-" should be -- 0-1-0 -- |
| Column 7, line 12 | "1-0-" should be -- 1-0-0 -- |

Signed and sealed this 10th day of April 1973.

(SEAL)
Attest:

EDWARD M.FLETCHER,JR.
Attesting Officer

ROBERT GOTTSCHALK
Commissioner of Patents